United States Patent

[11] 3,582,213

| [72] | Inventor | Jean-Michel Catherin<br>Savigny-sur-Orge, France |
|---|---|---|
| [21] | Appl. No. | 803,220 |
| [22] | Filed | Feb. 28, 1969 |
| [45] | Patented | June 1, 1971 |
| [73] | Assignee | Compagnie Generale D'Electricite<br>Paris, France |
| [32] | Priority | Mar. 1, 1968 |
| [33] | | France |
| [31] | | 142130 |

[54] LASER ANGLE OF ROTATION MEASURING APPARATUS
4 Claims, 3 Drawing Figs.

[52] U.S. Cl. .................................................. 356/152,
33/1N
[51] Int. Cl. ...................................................... G01b 11/26
[50] Field of Search ........................................... 356/152,
158, 141, 151, 149; 250/216

[56] References Cited
UNITED STATES PATENTS
2,934,825  5/1960  Braybrook ................... 356/152X Primary Examiner—Rodney D. Bennett, Jr.
Assistant Examiner—J. M. Potenza
Attorney—Sughrue, Rothwell, Mion, Zinn & MacPeak

ABSTRACT: Angle of rotation measuring device comprising a platform rotating at any speed supporting a circular-shaped laser which delivers beats in relation to the support whose angle of rotation is to be measured, the measurement of said angle being obtained by the difference between the number of pulses measuring the speed of rotation of the platform in relation to the support and the number of pulses measuring the beat frequency.

PATENTED JUN 1 1971

3,582,213

SHEET 1 OF 2

LASER ANGLE OF ROTATION MEASURING APPARATUS

The invention relates to a device for measuring angles of rotation.

It is known that in a ring-type laser formed of a laser tube disposed in a polygonal optical cavity actuated with a speed of rotation in its plane there are set up two traveling waves of opposite direction and of different velocities and frequencies. This is because the optical length of the cavity is not the same, depending upon whether the wave travels in the same direction or in the opposite direction to the direction of rotation of the ring-type laser. A device comprising semitransparent plates is disposed in the output of the ring-type laser to collect the two waves on a photosensitive cell. The beat frequency obtained at the output of this cell is equal to the difference of the frequencies of the traveling waves.

If all the pulses corresponding to the periods of the beat frequency are integrated in a counter while a ring-type laser is rotating through an angle $\theta$, the number of pulses counted may serve as a measure of this angle.

The known angle-measuring method is based upon the measurement of the ratio of the number of pulses supplied while the ring-type laser is rotating through an angle $\theta$ to the number of pulses supplied when it rotates through $2\pi$.

Figure 1:
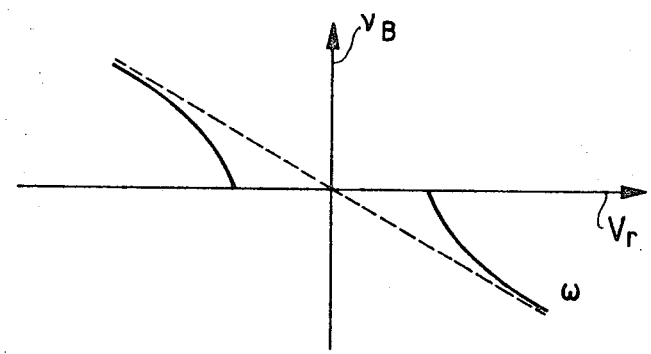

It is also known that when a ring-type laser is rotated at very low speeds, a threshold is observed below which the beat between the two traveling waves can no longer be shown. This is illustrated by FIG. 1, which shows the curve of the beat frequency $\omega$ of the two waves as a function of the speed of rotation $\omega$ of the ring-shaped laser. The curve of FIG. 1 shows the existence of a blind zone of a few hundred cycles per second on either side of zero. For measuring a low speed of rotation, it is necessary to create artificially an anisotropy for shifting this blind zone towards unused values of the speeds of rotation. A number of methods of creating anisotropy are known. For example, anisotropy may be created by imparting a constant speed of rotation to the plate supporting the ring-type laser. This solution requires high stability of this constant speed of rotation.

The value of the anisotropy thus obtained is a function of the speed of rotation of the whole plate. In the case of a goniometer, when the support on which the rotating plate is mounted is subjected to a rotation in the opposite direction to the rotation of the plate, the relative velocity of the plate in relation to the support must remain in the same direction as the actual velocity of the plate, for example in a Galilean base. If the relative velocity of the plate changes direction, the blind zone is passed through, which results in an error of measurement of the goniometer because of the absence of a beat during the passage through this blind zone. Moreover, it is necessary for the relative velocity of the plate, while remaining in the same direction, not to tend towards zero, because, as is shown by the curve of FIG. 1, the blind zone is distributed on either side of zero and the curve $p$ has a nonlinear portion on either side of zero.

The application of the above-described method of creating anisotropy to the measurement of angles therefore involves two conditions:

1. a constant speed of rotation of high stability, which is very difficult to obtain, and
2. a particular anistropy for each field of application, depending upon the speeds of rotation to which the support of the plate of the ring-shaped laser will be subjected. For low speeds of rotation, for example on a ship, a relatively low speed of rotation is imparted to the plate in relation to the speed of rotation imparted to the plate disposed aboard a craft, which turns on itself at very high speeds, as is the case, for example, with artificial satellites. These are two very different fields which require the application of entirely different technologies.

Other solutions for creating anisotropy are known, such as, for example, that of imparting to the plate an oscillatory movement such that the speed of rotation assumes successive values on either side of the speed corresponding to the blind beat. This solution is attended by many disadvantages known to a person skilled in the art.

A solution is also known which consists in employing the anisotropy due to the laser itself. When the gas laser is supplied with a direct current of appropriate strength, there is obtained a frequency beat of the order of a few thousand cycles per second for the maintenance of the discharge of the laser tube. The value of the frequency of the beat thus obtained depends upon the supply current and is certainly not sufficient for some applications.

The present invention has for its object to obviate these disadvantages.

The present invention concerns a device for the application of a ring-type laser to the measurement of angles of rotation, which is distinguished notably by the fact that the device comprises a plate rotating at any speed of rotation and supporting a ring-type laser which supplies beats, the plate being rotated on a support comprising means for supplying information at each revolution of the plate.

In accordance with another feature of the present invention, the speed of rotation of the plate is higher than a given speed which is itself higher than the maximum speed of rotation of the craft on which the device according to the invention is installed.

In accordance with another feature of the present invention, the device comprises an electronic beat-analyzing circuit.

The present invention affords many advantages. A first advantage of the device according to the invention resides in the fact that the speed of rotation of the plate need not be stabilized or constant. It is sufficient for it to be above a predetermined value.

The anisotropy obtained is very easy to interpret and permits obtaining a signal in the form of pulses, the number of which is proportional to the angular deflection to be measured.

The precision of the measurement given by the device according to the invention is independent of the speed of rotation of the plate.

The construction of the device according to the invention does not necessitate the addition of further optical elements in the cavity, so that all parasitic retrodiffusion is avoided and a simple optical assembly can be preserved which lends itself to a rigid construction.

Finally, the construction of the device is very simple, and does not require the use of complex and delicate technological methods or of electronic circuits necessitating elaborate investigations or of components of higher than normal quality.

Figure 2:
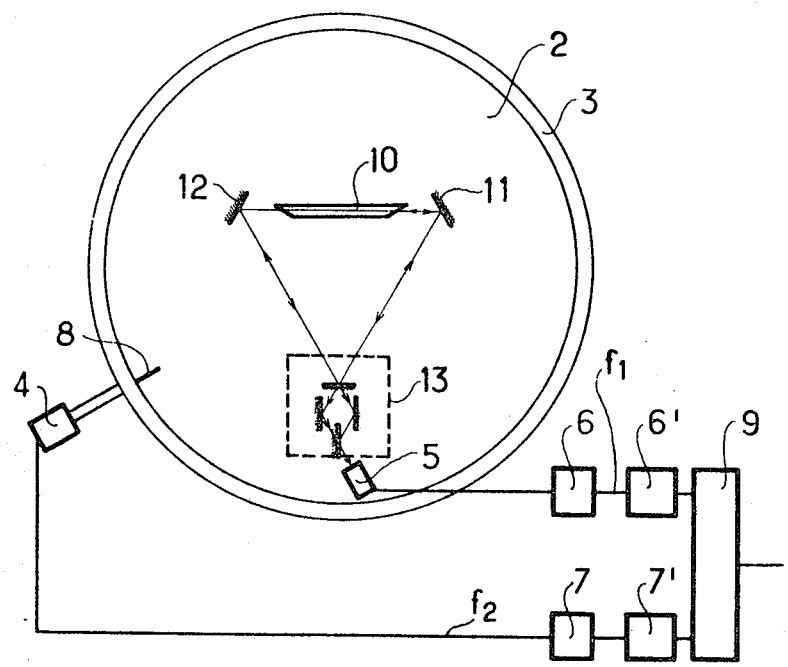
Figure 3:
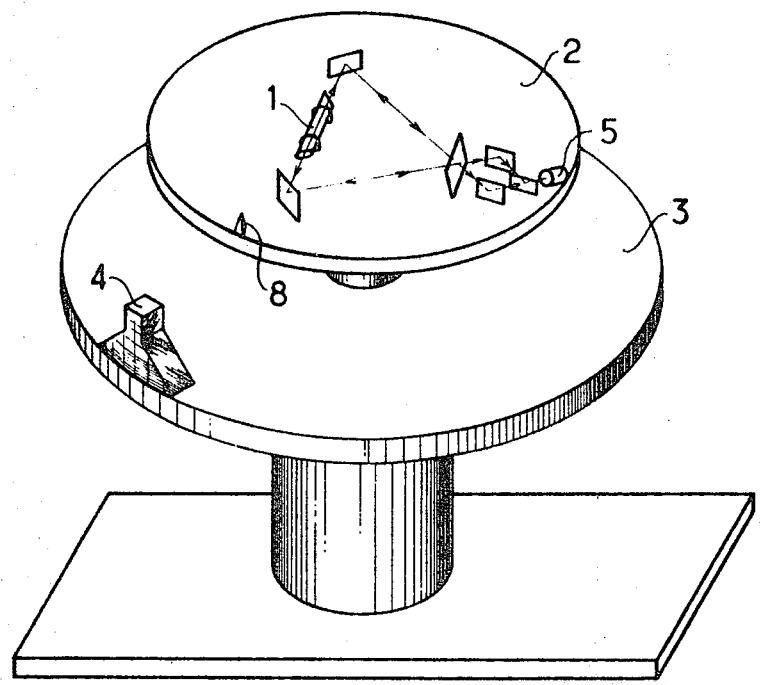

Further features and advantages of the present invention will become apparent in the course of the following description with reference to the accompanying drawings, in which:

FIG. 1 shows the curve of the beat frequency of the two waves of a ring-type laser as a function of the speed of rotation of the laser, FIG. 2 is a diagram illustrating the principle of the device according to the invention, and FIG. 3 is a view in perspective of the device according to FIG. 2.

In FIG. 2, there is shown the basic diagram of a ring-type laser comprising a laser tube 10, two mirrors 11 and 12 and a mixing optical system 13.

The ring-type laser is mounted on a plate 2 actuated with a rotational movement in relation to a support 3 about an axis perpendicular to the plane of the figure. The support 3 is securely mounted on a craft, for example a ship, whose changes of orientation are to be measured.

The anisotropy created by turning the laser about an axis perpendicular to the plane of the figure is given by the formula $$\Delta f = \frac{4 \cdot \omega \cdot S}{P \cdot \lambda},$$

$P$ being the periphery of the cavity, $S$ its surface, $\omega$ the speed of rotation of the laser, and $\lambda$ the wavelength of the laser emission.

For a complete revolution, this frequency difference, also called the scale factor, has a value of the order of $10^6$ to $5.10^6$ beat pulses for the ring-type lasers of the current type.

The device according to the invention comprises a means capable of supplying a pulse at each revolution of the plate 2. This means may be a device as described in French Pat. PV 87,457, applied for Dec. 14, 1966 in the name of the applicants, and comprising a photoelectric cell 4 secured to a support 3 and cooperating with a reference mark 8 provided on the rotating plate 2.

The photosensitive cell 5, onto which there impinges the two beams of the laser 1 mixed in the mixer 13, supplies a beat of frequency B which is converted into pulses by a circuit 6, these pulses thereafter being counted in a counter 6'.

The multiplier 7 supplies a number of pulses equal to the product of the number of revolutions $n$ of the plate in relation to the support 3 by the scale factor $N_{2\pi}$. This number of revolutions is given by the processing of information formed by the pulses emitted by the photosensitive cell 4 each time the reference mark 8 travels past the cell 4.

The difference between the number of pulses at the output of the counter 6' and the number of pulses supplied by the multiplier 7 and counted by the counter 7' is established by the subtractor 9. The subtractor 9 supplies a number of pulses proportional to the rotation undergone by the support 3 in relation to the Galilean base. The number of pulses at the output of the multiplier 7 is equal to $n \times N_{2\pi}$. At the output of the counter 6, there is obtained a number of pulses $N_1$ representing the rotation of the plate 2 in relation to the Galilean base. This number $N_1$ can be written in the form $$N_1 = k N_{2\pi} \pm |\Delta N_{2\pi}|$$

, $k$ being an integer and $\Delta N_{2\pi}$ a number lower than $N_{2\pi}$. The quantity of pulses $N$ obtained at the output of the subtractor is therefore equal to $$N = n \times N_{2\pi} - K N_{2\pi} \pm |\Delta N_{2\pi}| = (n-k) N_{2\pi} \pm |\Delta N_{2\pi}|$$

For a rotation $\alpha$ of the support 3 in relation to the Galilean base of less than $2\pi$, the expression $(n-k) N_{2\pi}$ is zero and the angle $\alpha$ is determined by the value $$N = \pm \Delta N_{2\pi}$$

and is given by the expression $$a = 2\pi \cdot \frac{\Delta N_{2\pi}}{N_{2\pi}}$$

The sign of the quantity $\Delta N_{2\pi}$ gives the direction of rotation of the support 3 in relation to the direction of rotation of the plate 2.

The scale factor of the ring-type laser is independent of the speed or rotation of the laser and in order to avoid the blind zone, a speed of rotation of any value may be imparted.

For correct operation of the device according to the invention, the scale factor of the ring-type laser must be measured with very high precision.

Of a number of methods which may be envisaged, there may be mentioned by way of example, the method consisting of turning the laser in one direction, which gives a number of pulses $(N_{2\pi})_1$ for $n$ revolutions, and then turning it in the other direction, which gives for the same number of revolutions a value $(N_{2\pi})_2$ the scale factor then being given by the formula $$[(N_{2\pi})_1 + (N_{2\pi})_2] \frac{1}{2\pi}$$

The measurement of the scale factor for two operations with different directions of rotation thus permits the elimination of parasitic effects due to the earth's rotation.

In order that the device according to the invention may operate correctly, it is also necessary for the anisotropy to be zero, i.e. for the number of pulses collected by the cell 5 to be an integer of $N_{2\pi}$ for a zero rotation of the plate 2 in relation to the support 3. This may be obtained, for example, either by using a symmetrical laser tube with a cathode at the center and a plate at each end, or by using two laser tubes connected in opposition, or further by using a single laser tube excited by a high frequency current of the order of 30 mc./s.

Of course, the invention is in no way limited to the embodiment described and illustrated, which has been referred to only by way of example.

More particularly, it is possible without departing from the scope of the invention to make modifications in detail, to change certain features and to replace certain means by equivalent means. Notably, the particular electronic circuit described in the foregoing has been mentioned only by way of example. On the other hand, the reading circuit may be connected in parallel with a continuous recording device, which is advantageous because the measurements would not be disturbed by it.

The device according to the invention may serve as an automatic pilot installed upon a ship or an artificial satellite, an aircraft or other movable or fixed device or craft capable of changing its orientation in relation to a fixed reference system such as the Galilean reference system.

Since the angle of rotation is encoded into the form of a number of pulses, it is very easy to use these pulses for the direct control of the steering control means of the craft. The steering control may be of the rudder, control surface, fuse, motor or servocontrol type. The described device may also serve, for example, as a theodolite with direct input into a computer.

What I claim is:

1. A device for measuring the angle of rotation of a support in relation to an inertial reference system comprising:
    a. a ring-type laser having zero anistropy in the inoperative state, said laser being disposed on a rotatable plate and being operative (actuated) to produce beats by rotational movement of said plate relative (in relation) to said support,
    b. means for producing a number of pulses characteristic of the number of beats supplied by said ring-type laser,
    c. means positioned relative to said plate for producing pulses characteristic of the number of revolutions of said plate, and
    d. logic means having inputs connected to the outputs of said aforementioned means for producing a signal characteristic of the difference between the number of said pulses characteristic of the number of revolutions of said plate and the number of pulses characteristic of the number of beats supplied by said ring-type laser and wherein said angle of rotation is proportional to said difference.

2. The device according to claim 1, wherein the means for producing pulses characteristic of the number of revolutions of said plate consists of a detector which emits a pulse each time said plate turns through an angle of 360° and which is connected to a memory which supplies the number of pulses which is a multiple of the scale factor of said ring-type laser.

3. The device according to claim 1, wherein the means for determining the number of pulses characteristic of the number of beats supplied by said ring-type laser consists of an optical system for causing the emergence of two light beams traveling in opposite directions in a triangular cavity of said ring-type laser and a photosensitive cell disposed at the output of said optical system for supplying a signal proportional to the beat of said two light beams.

4. The device according to claim 1, wherein the means for producing said difference between the number of pulses characteristic of the number of revolutions of said plate and the number of pulses characteristic of the number of beats supplied by said ring-type laser consists of two pulse counters whose outputs are connected respectively to the two inputs of a subtractor circuit.